(12) United States Patent
Ledbetter (10) Patent No.: US 10,770,202 B1
(45) Date of Patent: Sep. 8, 2020

(54) STRIPED CABLE AND PROCESS AND APPARATUS FOR MAKING SAME

(71) Applicant: Southwire Company, LLC, Carrollton, GA (US)

(72) Inventor: Scotty J. Ledbetter, Bowdon, GA (US)

(73) Assignee: Southwire Company, LLC, Carrollton, GA (US)

( * ) Notice: Subject to any disclaimer, the term of this patent is extended or adjusted under 35 U.S.C. 154(b) by 714 days.

(21) Appl. No.: 14/186,215

(22) Filed: Feb. 21, 2014

Related U.S. Application Data

(60) Provisional application No. 61/767,497, filed on Feb. 21, 2013.

(51) Int. Cl.
*H01B 7/00* (2006.01)
*H01B 7/36* (2006.01)

(52) U.S. Cl.
CPC .................. *H01B 7/361* (2013.01)

(58) Field of Classification Search
CPC ........ H01B 7/361; H01B 7/363; H01B 7/365; H01B 7/366
USPC .............................. 174/112, 120 R
See application file for complete search history.

(56) References Cited

U.S. PATENT DOCUMENTS

| | | | |
|---|---|---|---|
| 2,521,123 A * | 9/1950 | Lawrence | B29C 47/064 425/113 |
| 3,303,252 A * | 2/1967 | Rogers | B29C 48/022 264/171.17 |
| 4,808,966 A * | 2/1989 | Ferlier | B44B 7/002 219/121.68 |
| 4,910,359 A * | 3/1990 | Dougherty | H01B 7/0823 174/110 V |
| 5,281,764 A * | 1/1994 | King | H01B 7/361 174/112 |
| 6,781,062 B2 * | 8/2004 | Kuss | H01B 7/295 174/120 R |
| 7,557,301 B2 * | 7/2009 | Kummer | B32B 27/30 174/110 R |
| 7,923,617 B2 * | 4/2011 | Nesbitt | G10D 3/10 84/188 |
| 9,035,187 B2 * | 5/2015 | Pons | H01B 7/366 174/112 |
| 9,251,927 B2 * | 2/2016 | Kim | H01B 7/04 |
| 2002/0129966 A1* | 9/2002 | Schneider | G02B 6/4438 174/112 |
| 2002/0185299 A1* | 12/2002 | Giebel | G02B 6/4482 174/110 R |
| 2009/0014200 A1* | 1/2009 | Lin | H01B 13/34 174/112 |
| 2010/0236811 A1* | 9/2010 | Sasse | C08L 23/04 174/110 PM |

(Continued)

*Primary Examiner* — Chau N Nguyen
(74) *Attorney, Agent, or Firm* — Merchant & Gould P.C.

(57) ABSTRACT

A multi-striped electrical cable may be provided. The multi-striped electrical cable may comprise a conductor, an inner layer, an outer layer, and a stripe. The conductor core may comprise a conductor. The inner layer may be around the conductor core and may comprise an inner layer polymer. The outer layer may be around the inner layer. The outer layer may comprise an outer layer polymer, an outer layer colorant, and an outer layer friction reducing additive. The stripe may be disposed on an outermost portion of the outer layer. The stripe may comprise a stripe polymer, a stripe colorant, and a stripe friction reducing additive.

21 Claims, 5 Drawing Sheets

(56) References Cited

U.S. PATENT DOCUMENTS

2010/0288528 A1* 11/2010 Houston ............ H01B 11/1895
174/102 R

* cited by examiner

STRIPED CABLE AND PROCESS AND APPARATUS FOR MAKING SAME

RELATED APPLICATION

Under provisions of 35 U.S.C. § 119(e), Applicant claims the benefit of U.S. provisional application No. 61/767,497, filed Feb. 21, 2013, which is incorporated herein by reference.

COPYRIGHTS

All rights, including copyrights, in the material included herein are vested in and the property of the Applicant. The Applicant retains and reserves all rights in the material included herein, and grants permission to reproduce the material only in connection with reproduction of the granted patent and for no other purpose.

BACKGROUND

Electrical cables may be used to transfer electrical energy. When manufacturing an electrical cable, various layers (e.g., insulation, jacket, etc.) may be extrude onto a conductor or a conductor core. Many times the electrical cable may include a stripe along the electrical cable's exterior. The stripe may be used to communicate to a person seeing the cable certain information about the electrical cable.

SUMMARY

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Embodiments of the present invention may provide cables, e.g., electrical cables, having a stripe along the length of the cable. Such striped cables may comprise (a) a conductor core comprising a conductor; (b) an inner layer around the conductor core, the inner layer comprising an inner layer polymer; (c) an outer layer around the inner layer; the outer layer comprising an outer layer polymer, an optional outer layer colorant, and an outer layer friction reducing additive; and (d) a stripe disposed on an outermost portion of the outer layer, the stripe comprising a stripe polymer, a stripe colorant, and an optional stripe friction reducing additive.

In another embodiment of the present invention, a method of making a striped electrical cable is disclosed and described herein. The method may comprise (i) providing a conductor core comprising a conductor; (ii) forming a multi-layer flow comprising an inner layer comprising an inner layer polymer; an outer layer around the inner layer, the outer layer comprising an outer layer polymer, an optional outer layer colorant, and an outer layer friction reducing additive; and a stripe disposed on an outermost portion of the outer layer, the stripe comprising a stripe polymer, a stripe colorant, and an optional stripe friction reducing additive; and (iii) applying the multi-layer flow onto the conductor core. The multi-layer flow may be formed prior to being applied onto the conductor core.

Other embodiments provided herein include a coextrusion head assembly that may be used to produce electrical cables having a stripe, as well as a dispensing ring that may be employed in a coextrusion head assembly to form a striped polymer flow. The coextrusion head assembly for producing an electrical cable having a stripe may comprise an inner flow channel configured to direct a flow of an inner layer around a conductor core; an outer flow channel configured to direct a flow of an outer layer around the inner layer; and a stripe flow channel disposed on an outermost portion of the outer flow channel, the stripe flow channel configured to direct a stripe flow on an outermost portion of the outer layer flow.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description

BRIEF DESCRIPTION OF THE DRAWINGS

The accompanying drawings, which are incorporated in and constitute a part of this disclosure, illustrate various aspects and embodiments of the present invention. In the drawings.

DETAILED DESCRIPTION

The following detailed description refers to the accompanying drawings. Wherever possible, the same or similar reference numbers are used in the drawings and the following description to refer to the same or similar elements or features. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description and its exemplary embodiments do not limit the scope of the invention.

The terms "a," "an," and "the" are intended to include plural alternatives, e.g., at least one, unless otherwise specified. Thus, for instance, the disclosure of a "conductor," a "friction reducing additive," etc., is meant to encompass one, or more than one, conductor, friction reducing additive, etc., unless otherwise specified.

All patents and publications mentioned herein are incorporated herein by reference for the purpose of describing and disclosing, for example, the constructs and methodologies that are described in the patents and publications, which might be used in connection with the presently described invention. The patents and publications discussed throughout the text are provided solely for their disclosure prior to the filing date of the present application. Nothing herein is to be construed as an admission that the inventors are not entitled to antedate such disclosure by virtue of prior invention.

While products, methods, and apparatus are often described in terms of "comprising" various components, steps, or parts, the products, methods, and apparatus also may "consist essentially of" or "consist of" the various components, steps, or parts, unless stated otherwise. For example, an electrical cable consistent with embodiments of the present invention may comprise; alternatively, may consist essentially of; or alternatively, may consist of; (a) a conductor core, and (b) an inner layer, (c) an outer layer, and (d) a stripe.

Certain embodiments of the present invention may describe and/or produce electrical cables having a stripe, while at the same time, these cables also may contain a friction reducing additive (e.g., a migratory slip additive) within the polymer matrix of the electrical cable. While not wishing to be bound by theory, Applicants believe that existing striped products do not concurrently satisfy both of these criteria, nor are existing methods and/or apparatus capable of producing cables that satisfy both of these criteria. Unexpectedly, Applicants have found that incorporating a friction reducing additive into an electrical cable with a stripe may require unique processing characteristics in order to maintain a stripe of substantial uniformity.

Electrical Cables

Consistent with embodiments disclosed herein, striped electrical cables of the present invention may comprise (a) a conductor core comprising a conductor; (b) an inner layer around the conductor core, the inner layer comprising an inner layer polymer; (c) an outer layer around the inner layer; the outer layer comprising an outer layer polymer, an optional outer layer colorant, and an outer layer friction reducing additive; and (d) a stripe disposed on an outermost portion of the outer layer, the stripe comprising a stripe polymer, a stripe colorant, and an optional stripe friction reducing additive. The conductor core may have any number of conductors, and in any suitable arrangement. For instance, the conductor core may comprise only one conductor. Alternatively, the conductor core may comprise two or more conductors. These two or more conductors may be assembled parallel to each other (straight), or stranded (stranded conductors), or arranged helically, as well as other orientations known to those of skill in art. Thus, the conductor core may comprise a plurality of stranded conductors.

Each individual conductor may be made from any suitable conductive or metal material, including various alloys. The conductor may comprise copper, a copper alloy, aluminum, an aluminum alloy, or combinations thereof. In one embodiment, for example, the conductor may comprise copper or a copper alloy, while in another embodiment, the conductor may comprise aluminum or an aluminum alloy. Such conductive materials may have various IACS electrical conductivities based on the respective end-use application of the electrical cable, and therefore, the electrical cables of this invention are not limited to any particular conductivity range.

Each individual conductor may be of any geometric shape, but most often, the conductor may have a substantially circular cross-sectional shape (e.g., a round or circular wire). Alternatively, the geometric cross-section of the conductor may be triangular, square, rectangular, or trapezoidal, and so forth. It is contemplated the conductor core may have individual conductors having either the same or different geometric cross-sections.

The total cross-sectional area of individual conductors (one or more) in the conductor core may vary considerably, but generally the conductor core may comprise a total area of conductive elements in a range from about 14 AWG to about 1000 kcmil. For instance, the total area of conductive elements in the conductor core may fall within in a range from about 14 AWG to about 8 AWG, or alternatively, within a range from about 6 AWG to about 1000 kcmil.

Figure 1:
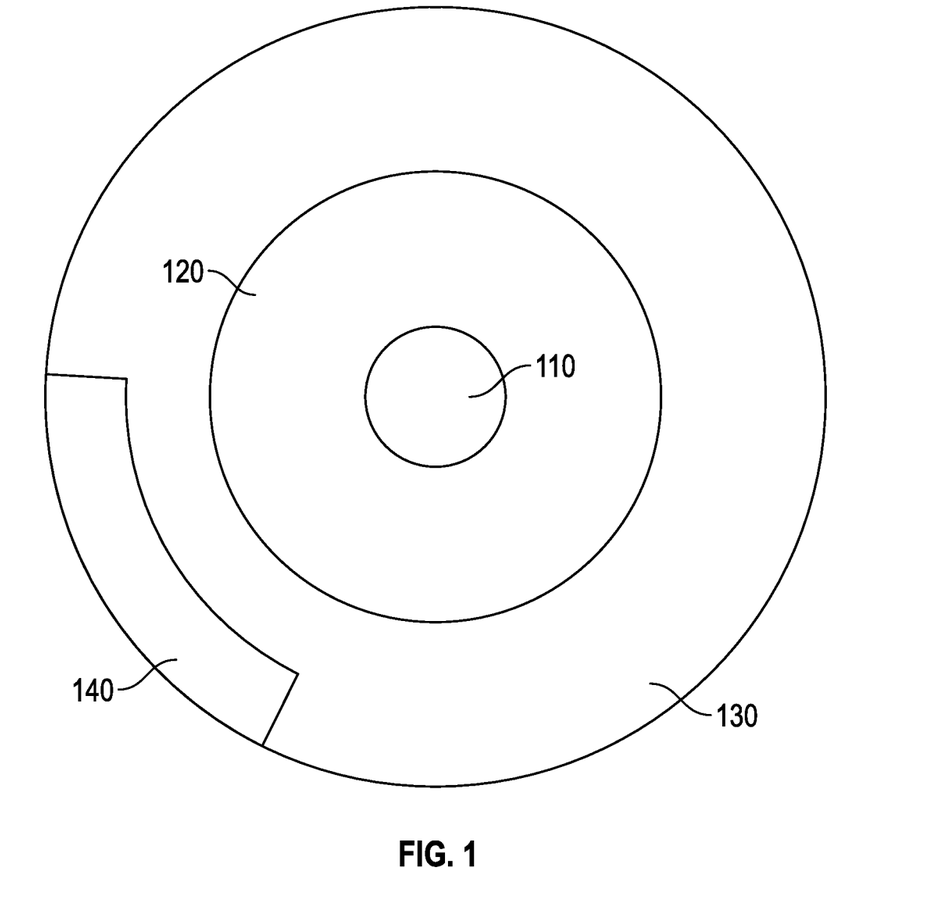
FIG. 1 is a cross-sectional view of an embodiment of a striped electrical cable of the present invention.

Referring now to FIG. 1, one embodiment of a striped electrical cable 100 is shown. The cable 100 is illustrated with a circular cross-sectional shape, but is not limited thereto. As illustrated, the electrical cable 100 may include a conductor core 110, which is shown as a single conductor, but could be two or more conductors, or a multitude of stranded conductors. The conductor is also shown with a circular cross-section (i.e., a cylindrical conductor), but could be any suitable geometric shape. Surrounding the conductor core 110 may be an inner layer 120, shown as a single layer around the conductor core 110, but not being limited thereto. Surrounding the inner layer 120 may be an outer layer 130. Disrupting the concentricity of the outer layer 130 throughout its thickness may be a stripe region 140, but not being limited thereto. The shape of the striped region 140 is illustrated in FIG. 1 with sharp edges and abrupt transitions to the outer layer 130. The actual shape of the striped region is not limited to that shown in FIG. 1 (e.g., the striped region 140 may have rounded edges). The striped region 140 may be present in the outermost portion of the outer layer 130. Thus, the stripe may be present in the cable insulation or jacketing matrix, and continue along the length of the cable, and are not merely printed or coated onto the outer surface of the cable.

In one embodiment, the arc length of the stripe may be less than about 50% of the circumference of the cable, while in another embodiment, the arc length of the stripe may be less than about 40%, or less than about 20%, of the circumference of the cable. For instance, the arc length of the stripe may be in a range from about 1% to about 50%, or from about 5% to about 25%, of the circumference of the cable.

The relative sizes and thicknesses of the outer layer and the striped region may vary considerably. As an example, the ratio of the maximum thickness of the outer layer to the average thickness of the stripe may be in a range from about 1.2:1 to about 10:1. In one embodiment, the ratio of the maximum thickness of the outer layer to the average thickness of the stripe may be in a range from about 1.4:1 to about 4:1, while in another embodiment, the ratio may be in a range from about 1.6:1 to about 3:1 (e.g., from about 2:1 to about 3:1). Moreover, in some embodiments, the ratio of the arc length to the average thickness of the stripe may be in a range from about 1:1 to about 10:1, or from about 2:1 to about 5:1.

Additionally, the relative sizes and thicknesses of the outer layer and the inner layer may vary considerably. As an example, the ratio of the maximum thickness of the outer layer to the average thickness of the inner layer may be in a range from about 0.2:1 to about 5:1. More often, this ratio may be in a range from about 0.3:1 to about 4:1, or from about 0.4:1 to about 3:1.

The respective compositions of the inner layer and the outer layer may be different in some embodiments, and additionally or alternatively, the respective compositions of the outer layer and the plurality of stripes may be different. These differences may be due to the differences in the respective polymer(s) used in the inner layer, the outer layer, and the stripes, and/or due to differences in the colorant(s) used in the inner layer, the outer layer, and the stripe.

It is not required for the outer layer to contain a colorant (i.e., the outer layer colorant is optional). In such circumstances, the presence of a stripe colorant may provide the multi-striped appearance to the electrical cable. More often, and in particular embodiments disclosed herein, the outer layer comprises a colorant, and the stripe colorant and the outer layer colorant may be different. Independently, the stripe colorant and the outer layer colorant may comprise a pigment or a dye; alternatively, a pigment; or alternatively, a dye. For example, the stripe colorant and the outer layer colorant independently may comprise carbon black, titanium dioxide, and the like, or a combination thereof. In various embodiments, the stripe colorant and the outer layer colorant independently may be black, white, red, blue, orange, yellow, green, purple, tan, gray, or a combination thereof; alternatively, black; alternatively, white; alternatively, red; alternatively, blue; alternatively, orange; alternatively, yellow; alternatively, green; alternatively, purple; alternatively, tan; or alternatively, gray. In one embodiment, the outer layer colorant may be black. In another embodiment, the stripe colorant may be yellow and the outer layer colorant may be black. In yet another embodiment, the stripe colorant may be purple and the outer layer colorant may be yellow.

The electrical cable may contain layers in addition to the inner layer and the outer layer, and the striped region. Each layer (e.g., inner layer, outer layer, striped region) may contain one polymer or a mixture/blend of two or more polymers. Illustrative and non-limiting examples of polymers that may be employed, independently, as the inner layer polymer, the outer layer polymer, and/or the stripe polymer may include, but are not limited to, a polyolefin, a chlorinated polyolefin, a chlorosulfonated polyolefin, a polychloroprene, a thermoplastic vulcanizate, an ethylene vinyl acetate, a polyamide, a polyvinyl chloride, and the like, as well as any mixture or combination thereof.

In some embodiments, the inner layer polymer, the outer layer polymer, and the stripe polymer independently may comprise a polyolefin; alternatively, a chlorinated polyolefin; alternatively, a chlorosulfonated polyolefin; alternatively, a polychloroprene; alternatively, a thermoplastic vulcanizate; alternatively, an ethylene vinyl acetate; alternatively, a polyamide; alternatively, a polyvinyl chloride; or alternatively, a polyolefin, a polyamide, a polyvinyl chloride, or any combination thereof.

In one embodiment, the polyolefin may comprise an ethylene homopolymer, an ethylene-based copolymer, a propylene homopolymer, a propylene-based copolymer, or a combination thereof. In another embodiment, the polyolefin may comprise an ethylene homopolymer. In yet another embodiment, the polyolefin may comprise an ethylene-butene copolymer, an ethylene-hexene copolymer, an ethylene-octene copolymer, or a combination thereof. In still another embodiment, the polyolefin may comprise a cross-linked polyethylene (XLPE); alternatively, an ethylene propylene rubber (EPR); or alternatively, an ethylene propylene diene monomer (EPDM) rubber.

In some embodiments, the inner layer polymer, the outer layer polymer, and the stripe polymer independently may comprise a chlorinated polyethylene (CPE), while in other embodiments, the inner layer polymer, the outer layer polymer, and the stripe polymer independently may comprise may comprise a chlorosulfonated polyethylene (e.g., grades are available under the HYPALON® brand), or alternatively, a polychloroprene (e.g., grades are available under the NEOPRENE® brand). However, in other embodiments contemplated herein, the inner layer polymer, the outer layer polymer, and the stripe polymer independently may comprise an ethylene propylene co-vulcanizate (EPCV), or alternatively, an ethylene vinyl acetate (EVA) copolymer.

In some embodiments, the inner layer polymer, the outer layer polymer, and the stripe polymer independently may comprise a polyamide (often referred to as a "nylon" polymer), while in other embodiments, the inner layer polymer, the outer layer polymer, and the stripe polymer independently may comprise a polyvinyl chloride (PVC). As a non-limiting example, the inner layer polymer may comprise a polyvinyl chloride, and the outer layer polymer may comprise a polyamide. In this embodiment, the stripe polymer also may comprise a polyamide.

Consistent with embodiments disclosed herein, a striped electrical cable may comprise a conductor core, an inner layer, an outer layer, and a stripe, and furthermore, the outer layer may comprise an outer layer friction reducing additive, and the stripe optionally may comprise a stripe friction reducing additive. It is not required for the stripe to contain a stripe friction reducing additive (i.e., the stripe friction reducing additive is optional). In such circumstances, the loading of the friction reducing additive in the outer layer, for example, may be sufficient to provide the required frictional properties of the electrical cable in a particular end-use application. More often, and in particular embodiments disclosed herein, the stripe may comprise a stripe friction reducing additive, and the outer layer friction reducing additive and the stripe friction reducing additive may be the same or different. The outer layer friction reducing additive and the stripe friction reducing additive independently may comprise a migratory friction reducing additive, often referred to as a migratory slip additive. Generally, at least a portion of the outer layer friction reducing additive may be present throughout the thickness of the outer layer, and/or at least a portion of the stripe friction reducing additive may be present throughout the thickness of the stripe. Accordingly, the outer layer friction reducing additive and the stripe friction reducing additive are not (external) coatings applied on the outermost surfaces of the outer layer and/or the stripe. Instead, these friction reducing additives may be added to the respective layers/polymers prior to the formation of the multilayer flow and striped electrical cable. Thus, no post-extrusion coating or other application of a friction reducing additive to the outer surface of the electrical cable is required. In accordance with various embodiments contemplated herein, the friction reducing additive may be an additive that reduces the coefficient of friction of the electrical cable and/or that reduces the installation force (e.g., pushing force, pulling force, etc.) of the electrical cable.

In an embodiment, the outer layer friction reducing additive and the stripe friction reducing additive independently may comprise a fatty amide, a hydrocarbon oil, and the like, or a combination thereof. Non-limiting examples of suitable friction reducing additives may include, but are not limited to, erucamide, oleamide, oleyl palmitamide, stearyl stearamide, stearamide, behenamide, ethylene bisstearamide, ethylene bisoleamide, stearyl erucamide, erucyl stearamide, and the like, as well as combinations thereof. In a particular embodiment, the outer layer friction reducing additive and the stripe friction reducing additive independently may comprise erucamide; alternatively, oleamide; alternatively, oleyl palmitamide; alternatively, stearyl stearamide; alternatively, stearamide; alternatively, behenamide; alternatively, ethylene bisstearamide; alternatively, ethylene bisoleamide; alternatively, stearyl erucamide; or alternatively, erucyl stearamide.

Such friction reducing additives may be present at a variety of amounts in the electrical cable, for instance, based on the particulars of the end-use application of the cable. Regardless, the outer layer friction reducing additive generally may be present in the outer layer at a weight percentage in a range from about 0.05 wt. % to about 15 wt. %, based on the total weight of the outer layer. For instance, the outer layer friction reducing additive may be present in the outer layer at a weight percentage in a range from about 0.1 wt. % to about 5 wt. %, or from about 0.1 wt. to about 1 wt. %, based on the total weight of the outer layer. Similar weight percentages also may apply for the stripe friction reducing additive, based on the total weight of the stripe.

In another embodiment, the outer layer friction reducing additive and the stripe friction reducing additive independently may comprise a mineral oil, a silicone oil, a siloxane (e.g., a polydimethylsiloxane), and the like, or a combination thereof. These friction reducing additives may be present at a variety of amounts in the electrical cable, for instance, based on the particulars of the end-use application of the cable. In some embodiments, however, an outer layer friction reducing additive comprising one or more of these materials may be present in the outer layer at a weight percentage in a range from about 0.05 wt. % to about 20 wt. %, based on the total weight of the outer layer. For instance, the outer layer friction reducing additive may be present in the outer layer at a weight percentage in a range from about 0.5 wt. % to about 20 wt. %, or from about 0.1 wt. % to about 15 wt. %, based on the total weight of the outer layer. Similar weight percentages for these materials also may apply for the stripe friction reducing additive, based on the total weight of the stripe.

In yet another embodiment, the outer layer friction reducing additive and the stripe friction reducing additive independently may comprise a plasticizer, a dibasic ester, a silicone, an anti-static amine, an organic amine, an ethanolamide, a mono- and/or di-glyceride fatty amine, an ethoxylated fatty amine, a fatty acid, zinc stearate, a stearic acid, palmitic acid, calcium stearate, lead stearate, zinc sulfate, and the like, as well as mixtures or combinations thereof. Often, these materials may be present in the outer layer (or the plurality of stripes) at a weight percentage in a range from about 0.05 wt. % to about 20 wt. %, based on the total weight of the outer layer (or the stripe).

Electrical cable structures, and polymers and friction reducing additives used therein, disclosed in U.S. Pat. Nos. 7,411,129, 7,557,301, and 7,749,024, and U.S. Patent Publication No. 2010/0236811, may be employed in various embodiments disclosed herein, and these patents/publications are incorporated herein by reference in their entirety.

In the cable products and methods disclosed herein, various other additives may be incorporated into the electrical cable, for instance, in the inner layer, and/or the outer layer, and/or the stripe. While not being limited thereto, the electrical cable (e.g., the outer layer, etc.) may contain a UV stabilization additive and/or a flame/smoke retardant additive, amongst various other additives, fillers, etc. Suitable UV stabilization additives may include UV absorbers, hindered amine light stabilizers (HALS), and the like, as well as combinations thereof. Non-limiting examples of flame/smoke retardant additives may include halogenated flame retardants, non-halogenated flame retardants, and the like, as well as combinations thereof.

In some end-use applications, it may be beneficial for the inner layer to be adhered or affixed to the conductor core, while in others, it may be beneficial for the inner layer (and outer layer, etc.) to be easy to remove from the conductor core. For instance, the electrical cable may contain a material between the conductor core and the inner layer, and this material may aid in stripping the polymer insulation from the conductor. Often, this material may be non-conductive, and it may partially or completely wrap/cover the conductor core. In some embodiments, the material may comprise a tape separator, which, for example, may comprise a layer (film or sheet) of a polyolefin, a polyamide, a polyvinyl chloride, a polyester, or any combination thereof. As an example, the tape separator may comprise a polypropylene film, or a polyester film, and so forth. In other embodiments, the tape separator may comprise a foil-based tape.

Producing Electrical Cables

Consistent with embodiments disclosed herein, methods of making a striped electrical cable may comprise (i) providing a conductor core comprising a conductor; (ii) forming a multi-layer flow comprising an inner layer comprising an inner layer polymer; an outer layer around the inner layer; the outer layer comprising an outer layer polymer, an optional outer layer colorant, and an outer layer friction reducing additive; and a stripe disposed on an outermost portion of the outer layer, the stripe comprising a stripe polymer, a stripe colorant, and an optional stripe friction reducing additive; and (iii) applying the multi-layer flow onto the conductor core. The multi-layer flow may be formed prior to being applied onto the conductor core.

Various features of the electrical cable, conductor core, conductor, inner layer, outer layer, plurality of stripes, polymers, colorants, friction reducing additives, etc., are discussed hereinabove. Any of these features and embodiments described herein may be utilized in the methods of making a striped electrical cable, and, accordingly, are encompassed herein.

The electrical cable may be produced by any manner known in the art. As an example, the electrical cable may be produced by a process that may comprise extruding the multi-layer flow (e.g., the inner layer, outer layer, and stripe) around the conductor core. In some embodiments, the multi-layer flow may be formed within a multi-layer extrusion head prior to be applied onto the conductor core. Methods of making electrical cable structures and the use of coextrusion that may be employed in various embodiments of this invention are disclosed in U.S. Pat. Nos. 6,573,456, 7,367,373, 7,637,298, and 8,101,862, which are incorporated herein by reference in their entirety.

Coextrusion Heads and Dispensing Rings

Another embodiment disclosed herein is a coextrusion head assembly for producing electrical cables having a stripe. One such coextrusion head assembly may comprise (A) an inner flow channel configured to direct a flow of an inner layer around a conductor core; (B) an outer flow channel configured to direct a flow of an outer layer around the inner layer; and (C) a stripe flow channel disposed on an outermost portion of the outer flow channel, the stripe flow channel configured to direct a stripe flow on an outermost portion of the outer layer flow.

Although not required, it may be beneficial for the coextrusion head assembly to be configured to join the flow of the inner layer, the flow of the outer layer, and the stripe flow, before the flow of the inner layer contacts the conductor core. Moreover, in a particular embodiment, the flow of the inner layer, the flow of the outer layer, and the stripe flow may be joined at a die tip within the coextrusion head assembly. Additionally, or alternatively, the flow of the outer layer and the flow of the inner layer may be concentric, prior to the addition of the stripe flow.

Since the coextrusion head assembly may be used to produce a striped electrical cable, the coextrusion head assembly may comprise a housing having an axial bore there through to receive the conductor core (i.e., the conductor core passes through the coextrusion head assembly).

Figure 2:
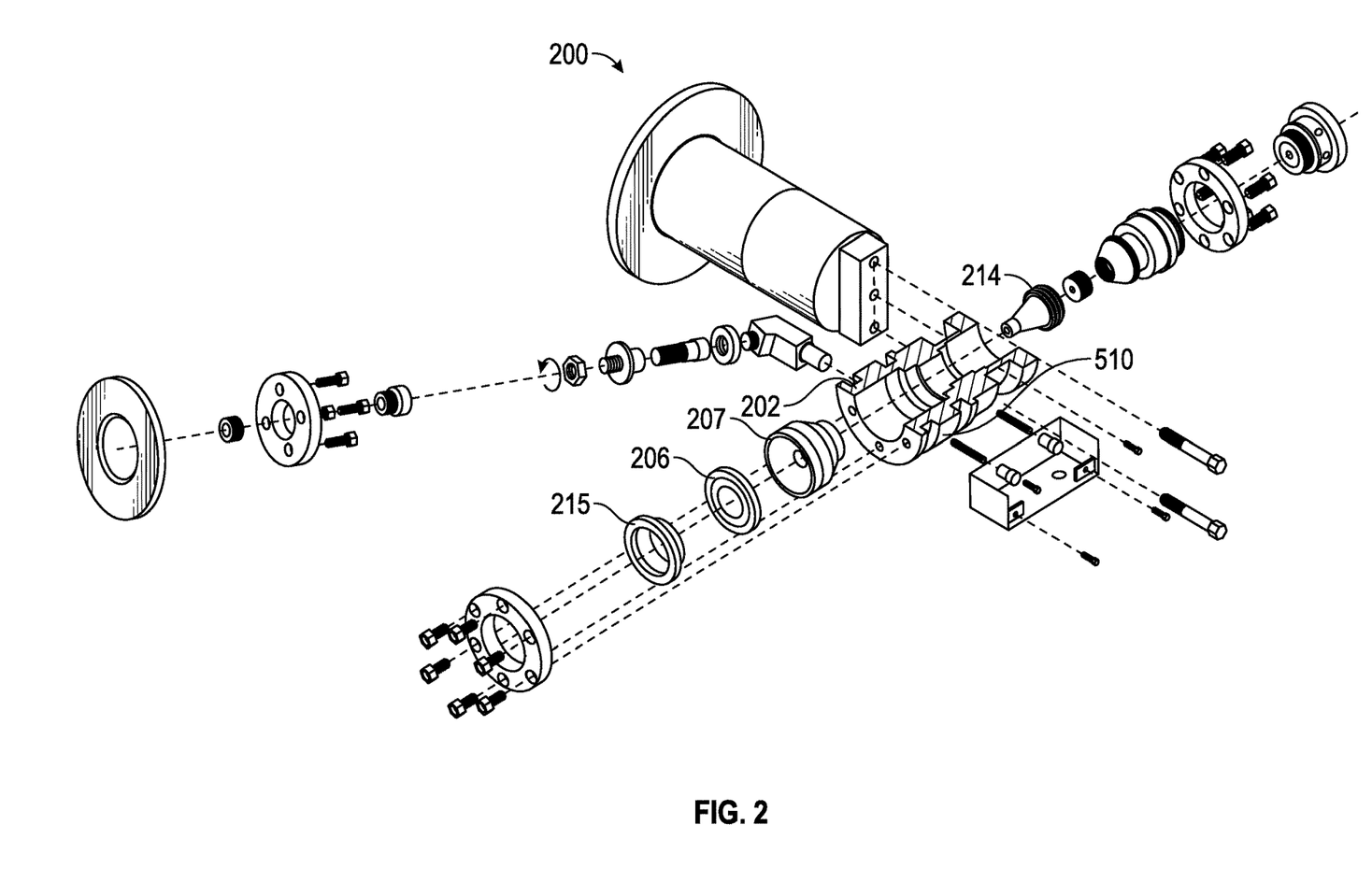
FIG. 2 is a diagram showing a knit line free tooling assembly.
Figure 3:
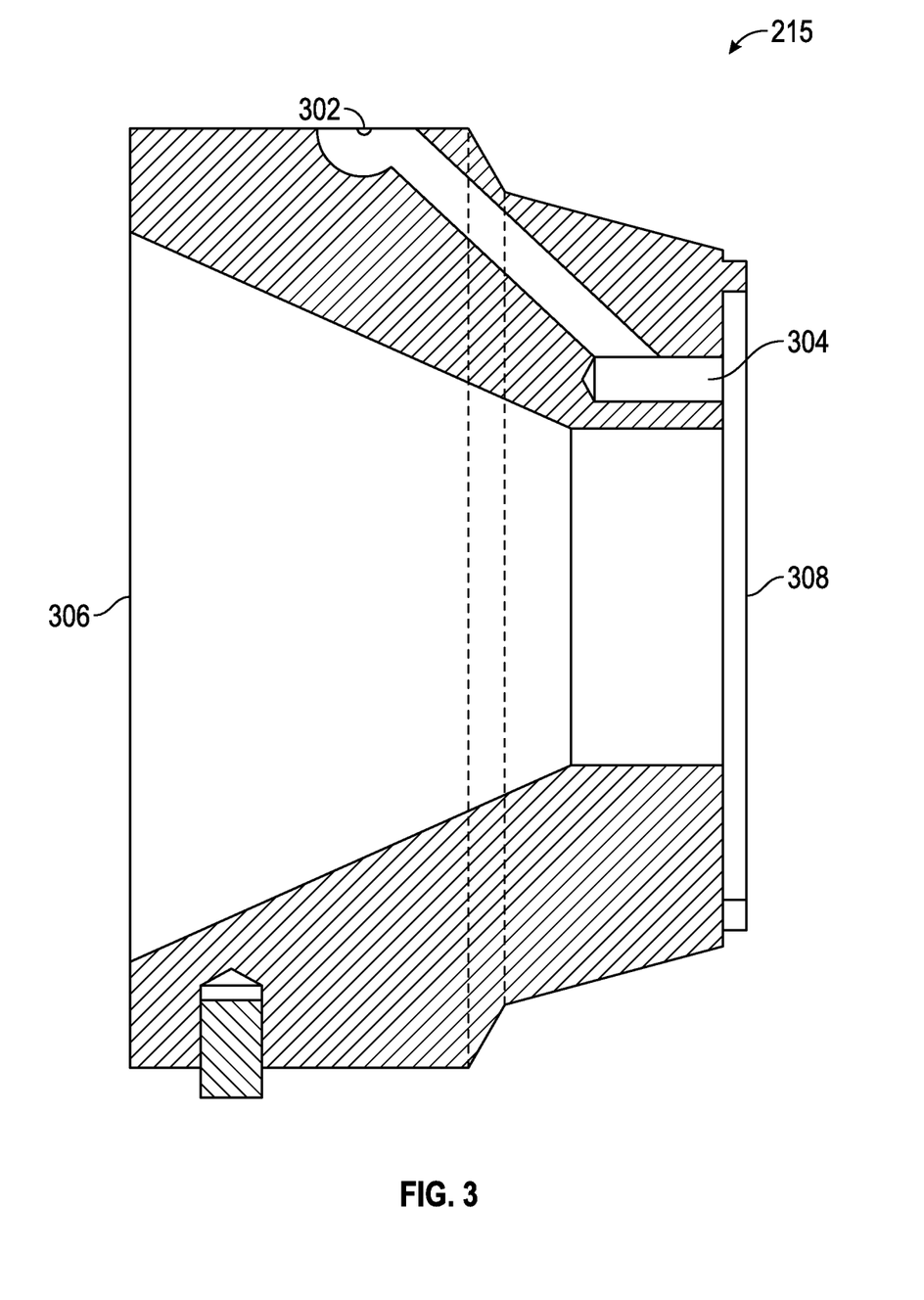
FIG. 3 is a tip-adapter.
Figure 4:
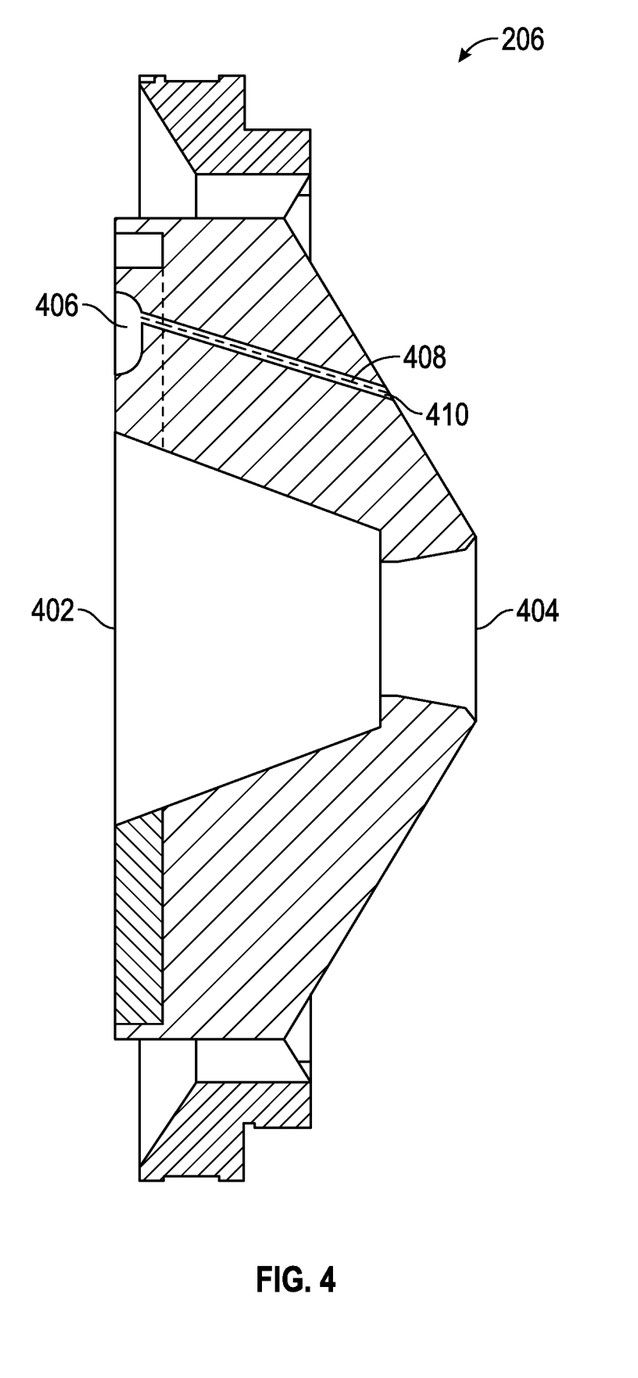
FIG. 4 is a tip die.

FIG. 2 shows knit line free tooling assembly 200 consistent with embodiments of the invention used, for example, to make knit line free cable 300. Knit line free tooling assembly 200 may comprise a co-extrusion head. A co-extrusion head may simultaneously extrude a plurality of dissimilar compound layers (e.g. inner layer 120 and outer layer 130) having different melting points onto a moving conductor (e.g. conductor core 110). The compound layers may be mechanically and thermally separated. Separating, for example, two compound layers may prevent thermal degradation of two extrudates (e.g., comprising the two compound layers) by causing their melting temperatures to remain substantially constant. As shown in FIG. 2, a tip adapter 215 and tip die 206 may be configured to cause the aforementioned lower pressure configured to cause outer layer 130 to be knit line free. FIGS. 3 and 4 show modifications to tip adapter 215 and tip die 206, consistent with embodiments of the invention in more detail. For example, a conventional tip die may be modified to create tip die 206.

Moreover, knit line free tooling assembly 200 may include air cooler 210. Consistent with embodiments of the invention, thermoplastic compounds layers (e.g., inner layer 120 and outer layer 130) having dissimilar application temperatures may be simultaneously applied to an electrical conductor (e.g., core conductor 110). By juxtaposing a thermal barrier and heat dissipater (e.g., air cooler 210) between segments of a segmented crosshead of knit line free tooling assembly 200, substantially continuous operation may be allowed. This may be accomplished by using the thermal barrier to retard heat migration from a hotter segment of the segmented crosshead and using the heat dissipater (e.g., air cooler 210) to remove and dissipate any heat passing through the barrier before it reaches a cooler head segment. This may prevent overheating the cooler segment of the segmented crosshead.

A stated above, the dissipater may comprise air cooler 210. Air cooler 210 may comprise one or more channels. To facilitate the aforementioned cooling process, a cooling material (e.g., cool air, cool water, antifreeze, nitrogen, etc.) may be circulated through these one or more channels. Consequently, the dissipater may be better able to remove and dissipate any heat passing through the dissipater before it reaches the cooler head segment than if the one or more channels and cooling material were not used.

FIG. 3 shows a tip adapter 215 and FIG. 4 show a tip die 206. The tip-adapter 215 and the tip die 206 make up the striping assembly 200. The tip adapter 215 includes a flow entrance port 302. The stripe polymer may enter the flow entrance port 302 and pass to a flow outlet port 304. The conductor core may enter the tip adapter 215 at a conductor inlet 308, pass through the tip adapter 215, and exit the tip adapter 215 at a conductor outlet 306.

The conductor core may enter the tip die 206 at a conductor entrance 404, pass through the tip die 206, and exit the tip die 206 at a conductor exit 402. The stripe polymer may enter the tip adapter 206 at a flow inlet port 406, pass through via a recessed flow channel 408, and exit the tip die 206 at an outlet port 410. As the conductor core passes through the tip die 206, the stripe polymer may flow through the tip die 206. At the tip die 206 the stripe polymer may be combined with the out layer.

Figure 5:
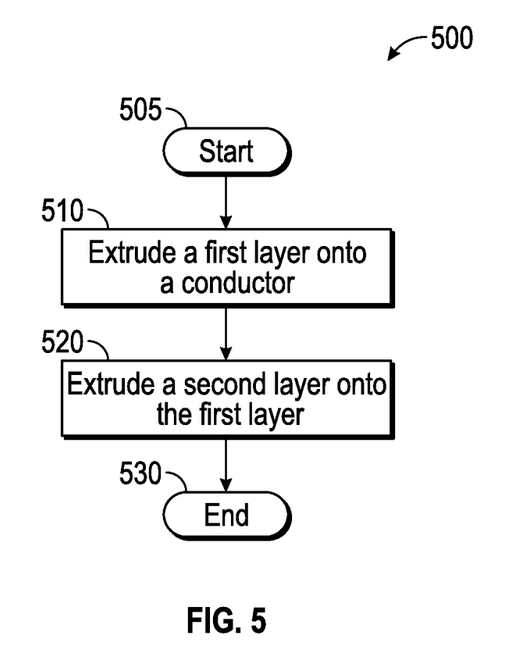
FIG. 5 is a flow chart of a method for providing a striped cable.

FIG. 5 is a flow chart setting forth the general stages involved in a method 500 consistent with an embodiment of the invention for providing cable 100. This method also prevents canoe splits in the cable. Method 500 may be implemented using knit line free tooling assembly 200 as described in more detail above with respect to FIG. 2. Ways to implement the stages of method 500 will be described in greater detail below. Method 500 may begin at starting block 505 and proceed to stage 510 where knit line free tooling assembly 200 may extrude inner layer 120 onto conductor core 110 using first tip 214. For example, Inner layer 120 may comprise nylon and may enter through inlet 302. Conductor core 110 may comprise any size, may comprise any material (e.g., copper, aluminum, etc.), and may be of any construction (e.g., stranded, solid, etc.). For example, conductor core 110 may be 600 MCM or larger. A first portion of knit line free tooling assembly 200 may be used to extrude inner layer 120 onto conductor core 110. The first portion of knit line free tooling assembly 200 may comprise, for example, that portion of knit line free tooling assembly 200 to the right of air cooler 210 as shown in FIG. 2.

From stage 510, where knit line free tooling assembly 200 extrudes inner layer 120 onto conductor core 110, method 500 may advance to stage 520 where knit line free tooling assembly 200 may extrude outer layer 130 onto inner layer 120 using a second tip. Outer layer 130 may be extruded at a pressure configured to cause outer layer 130 to be free of a knit line. Furthermore, outer layer 130 may comprise a sheath material comprising a lubricating material mixed with the sheath material. For example, a second portion of knit line free tooling assembly 200 may be used to extrude outer layer 130 onto inner layer 120. The second portion of knit line free tooling assembly 200 may comprise, for example, that portion of knit line free tooling assembly 200 to the left of air cooler 210 as shown in FIG. 2. For example, the second portion may be configured to receive melted pellets. Each of the pellets may comprise the sheath material and the lubricating material. In addition, the second portion may form the melted pellets into second layer 315. The sheath material may comprise a nylon material and the lubricating material may comprise a silicone material.

In addition, the second portion may be configured to receive melted pellets where a first portion of the pellets may comprise the sheath material and a second portion of the pellets may comprise the lubricating material. The second portion may be configured to receive the melted combination of the first portion of the pellets and the second portion of the pellets and form the melted pellets into outer layer 130. Once knit line free tooling assembly 200 extrudes outer layer 130 onto inner layer 120 in stage 520, method 500 may then end at stage 530.

Consistent with embodiments disclosed herein, a dispensing ring may comprise a generally cylindrical shell portion having an interior surface and an exterior surface, the exterior surface having a recessed flow channel around a circumference of the exterior surface; an inlet port on the exterior surface, the inlet port communicating with the recessed flow channel; an outlet port positioned with an entrance on the recessed flow channel and an outlet port. The dispensing ring may be used in a coextrusion head assembly as described herein to produce a polymer flow containing a stripe. The dispensing ring may result in a polymer flow containing a stripe.

Example

The invention is further illustrated by the following example, which is not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

In the example, a striped 400 kcmil electrical cable with copper conductors may be produced. The inner layer, outer layer, and stripe may be nylon. The inner layer and outer layer may contain a black colorant, while the stripes may contain a yellow colorant. A friction reducing additive, e.g., a polydimethylsiloxane, may be used at about 8 wt. % in the outer layer and the stripe. A 6-inch extruder running at 34 rpm may be used to supply the inner layer around the conductor at a pressure of about 2,800 psi. The flange temperature and head temperature may be around 350° F. and 355° F., respectively. A 3.5-inch extruder running at 84 rpm may be used to supply the outer layer around the inner layer at a pressure of about 3,950-4,100 psi. The adaptor temperature and head temperature may be around 365° F. and 385° F., respectively. A 2-inch extruder may be used to supply the stripe at a pressure of about 2,200-2,350 psi. The zone 1, zone 2, zone 3, clamp, and feeder tube temperatures may be about 340° F., 355° F., 370° F., 380° F., and 380° F., respectively. A 1.39-inch die may be used, with equal a slot (or flow channel) for the stripe. The line speed may be around 200 fpm.

While certain embodiments of the invention have been described, other embodiments may exist. Further, the disclosed methods' stages may be modified in any manner, including by reordering stages and/or inserting or deleting stages, without departing from the invention. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

We claim:

1. An electrical cable comprising:
    a conductor core comprising a conductor;
    an inner layer around the conductor core, the inner layer comprising an inner layer polymer;
    an outer layer around the inner layer, the outer layer comprising an outer layer polymer, an outer layer colorant, and an outer layer friction reducing additive, wherein the outer layer friction reducing additive comprises a first friction reducing additive; and
    a stripe disposed in an outermost portion of the outer layer disrupting concentricity of the outer layer, the stripe comprising a stripe polymer, a stripe colorant, and a stripe friction reducing additive, wherein the stripe friction reducing additive comprises a second friction reducing additive, wherein at least a portion of the stripe friction reducing additive is present throughout the stripe, the outer layer and the stripe forming a continuous outer contour for the electrical cable, wherein the outer layer friction reducing additive is present throughout a thickness of the outer layer wherein the inner layer, the outer layer, and the stripe comprise a multi-layer flow attached to the conductor core, and wherein a distance between an outside surface of the stripe and a center of the conductor core is equal to a distance between an outside surface of the outer layer and the center of the conductor core, and wherein the outer layer polymer is a polyamide; and wherein the stripe polymer is different than the outer layer polymer.

2. The cable of claim 1, wherein an arc length of the stripe is from about 1% to about 25% of a circumference of the cable.

3. The cable of claim 1, wherein a ratio of a maximum thickness of the outer layer to an average thickness of the stripe is in a range from about 1.2:1 to about 10:1.

4. The cable of claim 1, wherein the stripe colorant and the outer layer colorant comprise different materials.

5. The cable of claim 1, wherein the inner layer polymer and the stripe polymer independently comprise a polyolefin.

6. The cable of claim 5, wherein the polyolefin comprises an ethylene homopolymer, an ethylene-based copolymer, a propylene homopolymer, a propylene-based copolymer, or a combination thereof.

7. The cable of claim 5, wherein the polyolefin comprises an ethylene-butene copolymer, an ethylene-hexene copolymer, an ethylene-octene copolymer, or a combination thereof.

8. The cable of claim 5, wherein the polyolefin comprises a crosslinked polyethylene.

9. The electrical cable of claim 5, wherein the inner layer polymer comprises a chlorinated polyolefin.

10. The electrical cable of claim 9, wherein the inner layer polymer comprises polyvinyl chloride.

11. The cable of claim 1, wherein the outer layer friction reducing additive and the stripe friction reducing additive are not applied coatings.

12. The cable of claim 1, further comprising a material between the conductor core and the inner layer.

13. The cable of claim 1, wherein the inner layer is adhered to the conductor core.

14. The electrical cable of claim 1, wherein the outer layer colorant and the stripe colorant comprise different materials, and the outer layer friction reducing additive and the stripe friction reducing additive comprise the same material.

15. The electrical cable of claim 1, wherein the outer layer friction reducing additive and the stripe friction reducing additive comprise different materials.

16. An electrical cable comprising:
    a conductor core comprising a conductor;
    an inner layer around the conductor core, the inner layer comprising an inner layer polymer;
    an outer layer around the inner layer, the outer layer comprising an outer layer polymer, an outer layer colorant, and an outer layer friction reducing additive; and
    a stripe disposed in an outermost portion of the outer layer, the stripe comprising a stripe polymer, and a stripe colorant, the outer layer and the stripe forming a continuous outer contour for the electrical cable, wherein the friction reducing additive is present throughout a thickness of the outer layer, and wherein the inner layer, the outer layer, and the stripe comprise a multi-layer flow attached to the conductor core, and wherein a distance between an outside surface of the stripe and a center of the conductor core is equal to a distance between an outside surface of the outer layer and the center of the conductor core, and wherein the outer layer polymer is a polyamide and wherein the stripe polymer is different than the outer layer polymer.

17. The cable of claim 16, wherein the outer layer is free of a knit line.

18. The cable of claim 16, wherein the inner layer, the outer layer, and the stripe are formed together before being applied to the conductor core.

19. The electrical cable of claim 16, wherein the outer layer polymer, having the outer layer friction reducing additive, and the stripe polymer, having a stripe friction reducing additive, are introduced into the multi-layer flow independently.

20. An electrical cable comprising:
a conductor core comprising a conductor;
an inner layer around the conductor core, the inner layer comprising an inner layer polymer;
an outer layer around the inner layer, the outer layer comprising an outer layer polymer, an outer layer colorant, and an outer layer friction reducing additive, the outer layer being free of a knit line, wherein the outer layer friction reducing additive comprises a first friction reducing additive; and
a stripe disposed on an outermost portion of the outer layer, the stripe comprising a stripe polymer, a stripe colorant, and a stripe friction reducing additive, the outer layer and the stripe forming a continuous outer contour for the electrical cable, wherein the stripe friction reducing additive comprises a second friction reducing additive, wherein at least a portion of the stripe friction reducing additive is present throughout the stripe, and wherein the outer layer friction reducing additive is present throughout a thickness of the outer layer wherein the inner layer, the outer layer, and the stripe comprise a multi-layer flow attached to the conductor core and wherein a distance between an outside surface of the stripe and a center of the conductor core is equal to a distance between an outside surface of the outer layer and the center of the conductor core, and wherein the stripe polymer is different than the outer layer polymer wherein the outer layer polymer is a polyamide.

21. The cable of claim 20, wherein the inner layer, the outer layer, and the stripe are formed together before being applied to the conductor core.

* * * * *